United States Patent [19]
Dosi et al.

[11] 4,316,157
[45] Feb. 16, 1982

[54] GAS RECIRCULATION SYSTEM FOR CARBON DIOXIDE LASERS

[75] Inventors: Mahendra K. Dosi, Ottawa; Douglas J. James; Anthony W. Pasternak, both of Kanata, all of Canada

[73] Assignee: Canadian Patents & Development Ltd., Ottawa, Canada

[21] Appl. No.: 66,176

[22] Filed: Aug. 13, 1979

[51] Int. Cl.$^3$ .............................................. H01S 3/14
[52] U.S. Cl. ...................................... 372/59; 372/60; 372/83
[58] Field of Search ..................... 331/94.5 G, 94.5 C, 331/94.5 D, 94.5 P, 94.5 DE

[56] References Cited

U.S. PATENT DOCUMENTS 3,789,320  1/1974  Hepburn ......................... 331/94.5 G
4,229,709  10/1980  McMahan ....................... 331/94.5 G

OTHER PUBLICATIONS

"A Sealed High-Repetition-Rate TEA $CO_2$ Laser", by Page et al., *IEEE Jour. Quant. Elect.*, vol. QE-14, No. 4, Apr. 1978.
"Sealed TEA $CO_2$ Lasers with External Control of Gas Chemistry", by Willis et al., *Appl. Phys. Lett.*, vol. 31, No. 2, Jul. 15, 1977.
"Effect of Hydrogen on $CO_2$ TEA Lasers", by Deutsch, *Appl. Phys. Lett.*, vol. 20, 315, (1972).
"Effect of Deuterium on the Operation of a $CO_2$ TEA Laser", by Albrecht et al., *JETP Lett.*, vol. 21, No. 1, Jan. 5, 1975.
"A Compact Sealed Pulsed $CO_2$ TEA Laser", by Stark et al., *IEEE Jour. Quant. Elect.*, vol. QE-11, No. 9, Sep. 1975.

*Primary Examiner*—William L. Sikes
*Assistant Examiner*—Léon Scott, Jr.
*Attorney, Agent, or Firm*—Edward Rymek

[57] ABSTRACT

A method and apparatus is described for reducing the gas consumption rate by controlling the gas composition in a repetitively pulsed high pressure and/or high energy density TE $CO_2$ laser. Detrimental gas species formed in the discharge are removed by chemical reaction in the gas phase and the reaction products are removed by a trap in a recirculator loop. In particular, the primary detrimental species is oxygen, the reducing gas added to remove this is hydrogen or deuterium and the resulting oxides of hydrogen or deuterium are removed by a molecular sieve.

11 Claims, 2 Drawing Figures

GAS RECIRCULATION SYSTEM FOR CARBON DIOXIDE LASERS

BACKGROUND OF THE INVENTION

This invention is directed to the recirculation of gas in carbon dioxide lasers, and in particular to a recirculating system which reduces the gas requirements by removing oxygen produced from the dissociation of carbon dioxide.

In carbon dioxide lasers which include mixtures of $CO_2$, $N_2$ and He, the dissociation of $CO_2$ into CO and atomic oxygen occurs and can result in degeneration of the uniform glow discharge, necessary for laser excitation, into an arc either directly, or through the production of detrimental species such as oxides of nitrogen. Several techniques have been developed to control the gas chemistry in TE $CO_2$ lasers such that steady-state operation may be achieved. One technique consists of including gas additives such as $H_2$ and CO in controlled amounts in the initial gas mixture, as described in the publication by P. N. Pace et al. in the IEEE Journal, QE, Vol. QE-14, No. 4, pp. 263-274, 1978. Another technique consists of using a catalyst in the gas loop of the laser to combine the carbon monoxide with the oxygen, as described in the publication by C. Willis et al. Applied Physics Letters, Vol. 31, No. 2, pp. 84-86, 1977.

These methods have proved effective in reducing the fuel gas requirements in TEA $CO_2$ lasers under a range of conditions, notably operation at or near one atmosphere and at relatively modest electrical input energy density. During the 1979 IEEE/OSA Conference on Laser Engineering and Applications held in Washington, D.C., May 30-June 1, 1979, H. Nagai et al. mentioned the use of a moisture adsorbent in a cw $CO_2$ laser in order to exclude $H_2O$ in the laser.

Under more extreme operating conditions, these techniques are no longer satisfactory, particularly in operation at pressures substantially in excess of one atmosphere. At higher pressure, the effectiveness of ultraviolet preionization is reduced due to absorption of this radiation in $CO_2$. Thus, the stability of the discharge, which is critically dependent on the number density of electrons produced by this radiation, is reduced and becomes more sensitive to the detrimental effects of gaseous discharge products. This in turn leads to a large input gas flow, particularly for repetitively pulsed operation, to ensure that the detrimental species are maintained below some critical concentration.

SUMMARY OF THE INVENTION

It is therefore an object of this invention to provide a method and apparatus to control the gas chemistry in a $CO_2$ laser so as to substantially reduce the fuel gas consumption.

According to one aspect of this invention, a predetermined amount of a reducing gas is added to the laser gas mixture of $CO_2$, $N_2$ and He. As the laser is operating, and the undesirable oxygen is produced, the oxygen reacts with the reducing gas to form an oxygen product that is removed from the laser gas mixture.

According to another aspect of this invention, the oxygen compound is removed in an external gas flow loop which contains a pump for recirculating the gas mixture and an absorber for absorbing the oxygen product.

According to yet another aspect of this invention, the reactant gas may be $H_2$ or $D_2$ in an amount in the order of 3%. In addition, the absorber may be a solid absorbent such as molecular sieve.

Other objects and aspects of the invention will be clear from the detailed description of the drawings.

DESCRIPTION OF THE PREFERRED EMBODIMENTS

Figure 1:
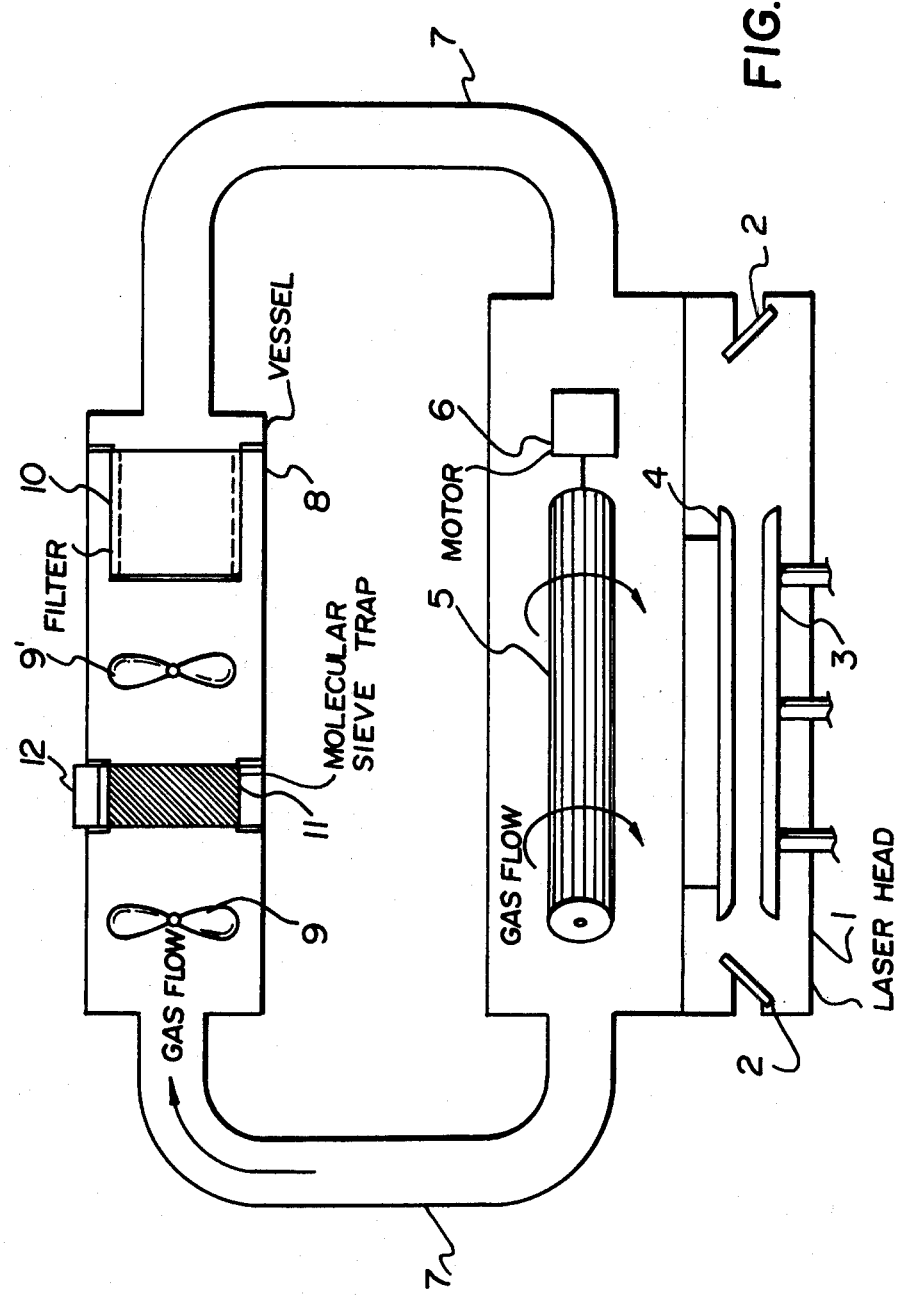
FIG. 1 illustrates a $CO_2$ laser in accordance with the present invention.

FIG. 1 illustrates schematically a $CO_2$ laser with a gas scrubber-recirculating system in accordance with the present invention. The laser itself is conventional. It includes a laser head 1, which in this instance is made of fiberglass, and has a NaCl Brewster window 2 at each end. Within the head, the energizing anode 3 and cathode 4 electrodes are mounted. These are connected to a source (not shown). The recirculating system includes an internal recirculating fan 5 driven by a motor 6. Fan 5 assures that the laser gas is tangentially blown through the gap between electrodes 3 and 4 in the laser head 1. The recirculation system further includes a loop 7 having a steel vessel 8. Within the vessel 8 are located one or more axial flow fans 9, 9', . . . and a cylindrical filter 10 for trapping any particulate matter from the laser gas. In addition, in accordance with the present invention, the vessel 8 also includes a molecular sieve 11 for trapping the oxygen products formed in accordance with this invention. Vessel 8 has an access 12 to allow access to the molecular sieve 11.

Since the gas mixture in $CO_2$ lasers consists of $CO_2$, $N_2$ and He, oxygen is produced in the laser discharge by electrical dissociation of $CO_2$. In order to eliminate the detrimental effects of oxygen in the gas mixture, in accordance with the present invention, a reducing gas is added to the laser gas mixture and thus the oxygen is removed by reacting it with the reducing gas. Thus the detrimental effects of oxidation of the electrodes and the production of detrimental species such as oxides of nitrogen are prevented. However, the oxygen product, when allowed to build-up in the laser gas mixture, will generally cause discharge instability to occur, and therefore the oxygen-product is preferably removed.

In order to maintain satisfactory operation of the $CO_2$ laser, the reducing gas added to the laser gas must not be detrimental to laser operation, it must react readily with the oxygen under laser discharge conditions, it must form an oxygen product which itself is not detrimental to laser operation until it can be removed from the gas mixture with the laser in operation. Hydrogen, $H_2$, and deuterium, $D_2$, are found to meet the above conditions and operate satisfactorily in a TE $CO_2$ laser having a $CO_2$, $N_2$, He gas mixture. $H_2$ may be added to a level in excess of 3% of the gas mixture, however, at levels much greater than 3%, the output energy of the laser is affected. Using $D_2$, on the other hand, $D_2O$ is produced and is found to absorb less optical energy in the laser. In addition, $H_2O$ and $D_2O$ can readily be absorbed in the molecular sieve 11 having the solid absorbent zeolite clay such as the Linde 13X.

Figure 2:
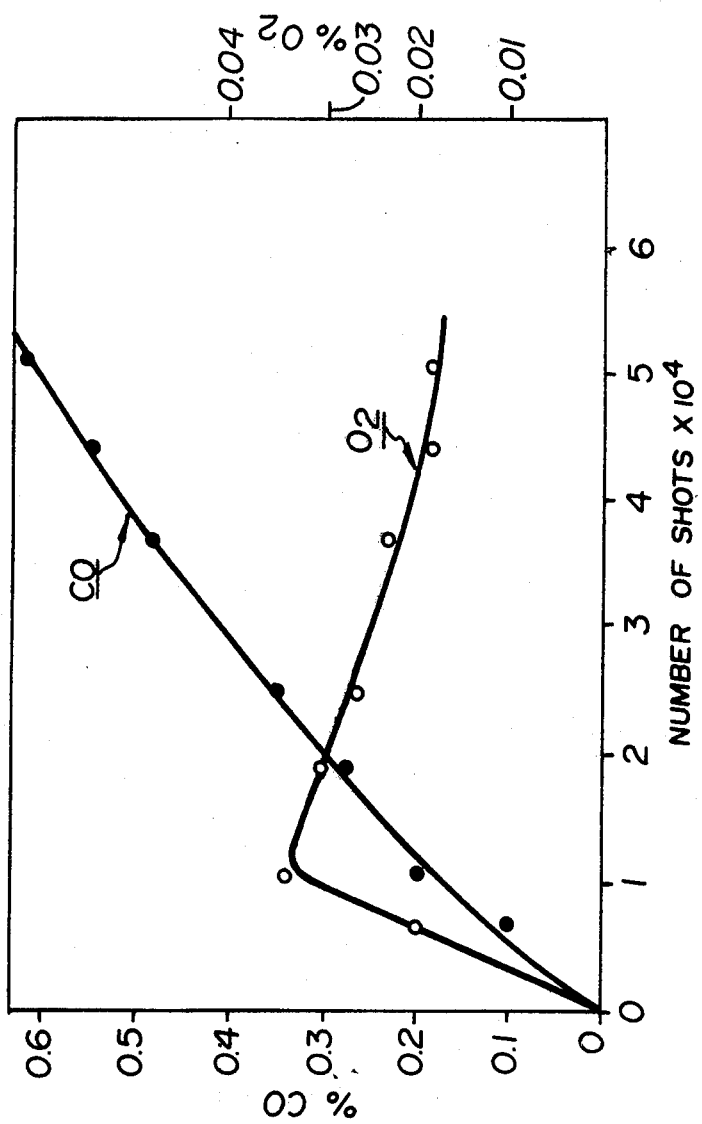
FIG. 2 illustrates an example of CO and $O_2$ concentration in a laser in accordance with the present invention.

FIG. 2 illustrates the concentrations of CO and $O_2$ during the operation of a typical TE $CO_2$ laser in accordance with the present invention. The laser gas mixture is 8% $CO_2$, 8% $N_2$, 81% He, and 3% $H_2$, and has a volume of 41 L. The laser operates at a pressure of 8 atmospheres, with an energy input of 80 joules per liter atmosphere, and a repetition rate f of 4 Hz. The absorber is a Linde 13X molecular sieve. It is noted that CO and $O_2$ are produced as the laser operates, however, that the amount of $O_2$ is stabilized at approximately 0.2% as the CO continues to increase.

The decrease of $CO_2$ and increase of CO concentrations slowly decreases the laser output energy which may either be adjusted by electrical input energy or by replacing the gas with a fresh supply batchwise after a substantial increase in operation lifetime. A continuous operation at constant energy output is achieved by continuously purging out the gas and adding fresh gas at a low flow rate. Using these techniques, a substantial decrease in gas consumption is achieved.

The gas recirculation system in accordance with the present invention is effective at pressures and energy levels particularly difficult for effective TE $CO_2$ laser operation. Table 1 illustrates cases of a TE $CO_2$ laser operation under various conditions.

TABLE 1

| | Gas Composition (%) | | | | Volume | Energy Input | Pressure | Repetition | No. of Arc |
| --- | --- | --- | --- | --- | --- | --- | --- | --- | --- |
| | $CO_2$ | $N_2$ | He | $H_2$ | (liters) | joules/lit. atm. | (atm.) | Rate (Hz) | Free Pulses |
| 1A | 8 | 8 | 84 | 0 | 41 | 80 | 8 | 4 | <700 |
| 1B | 8 | 8 | ~82.3 | ~1.7 | 41 | 80 | 8 | 4 & 5 | $2.3 \times 10^4$ |
| 2A | 8 | 8 | 84 | 0 | 41 | 80 | 8 | 2 | 1100 |
| 2B | 8 | 8 | 80.6 | 3.4 | 41 | 80 | 8 | 2 & 4 | $>5.6 \times 10^4$ |
| 3 | 8 | 8 | 81 | 3 | 41 | 50–62.5 | 8 | 5 | $21.5 \times 10^4$ |
| 4A | 21 | 10.5 | 68.5 | 0 | 76.5 | 170 | 1 | 1/10 | 45 |
| 4B | 21 | 10.5 | 65.8 | 2.7 | 76.5 | 170 | 1 | 1/10 | 430 |
| 5A | 24 | 9 | 67 | 0 | 892.8 | 180 | 1 | 1/50 | 25 |
| 5B | 24 | 9 | 64.4 | 2.6 | 892.3 | 180 | 1 | 1/50 | 146 |
| 6A | 24 | 12 | 64 | 0 | 198.2 | 280 | 2.5 | 1/120 | 5 |
| 6B | 24 | 12 | 61 | 3 | 198.2 | 280 | 2.5 | 1/120 | >101 |

At high pressure, i.e. cases 1A–3, it is seen that the useful life of a batch of laser gas is increased up to 1000 times when $H_2$ is added to the gas mixture and $H_2O$ is removed. With high energy input, i.e. cases 4A to 6B, the useful life of a batch of laser gas is increased up to 20 times.

Modifications in the above described embodiments of the invention can be carried out without departing from the scope thereof and therefore the scope of the present invention is intended to be limited only by the appended claims.

We claim:

1. In a method of operating a laser with a gas mixture having $CO_2$ within the laser, wherein the $CO_2$ dissociates to produce $O_2$, the steps including:
   (a) adding a reducing gas to the gas mixture to produce an oxygen-product with the $O_2$ within the laser; and
   (b) removing the oxygen-product from the laser.

2. A method as claimed in claim 1 wherein the reducing gas is selected from the group consisting of $H_2$ or $D_2$.

3. A method as claimed in claim 2 wherein the reducing gas is in the order of 3% of the gas mixture.

4. A method of operating a laser having a gas mixture including $CO_2$, $N_2$, He and $H_2$, wherein the $CO_2$ dissociates to produce $O_2$, including the steps of:
   (a) reacting the $O_2$ with the $H_2$ in the laser to form $H_2O$; and
   (b) removing the $H_2O$ from the laser during operation.

5. A method of operating a laser having a gas mixture including $CO_2$, $N_2$, He and $D_2$, wherein the $CO_2$ dissociates to produce $O_2$, including the steps of:
   (a) reacting the $O_2$ with the $D_2$ in the laser to form $D_2O$; and
   (b) removing the $D_2O$ from the laser during operation.

6. A method as claimed in claims 4 or 5 wherein step (b) includes passing the gas mixture through a molecular sieve.

7. In a gas laser wherein the gas mixture within the laser includes $CO_2$ and where, in operation, the $CO_2$ dissociates to produce $O_2$, the gas laser further including:
   a reducing gas in the gas mixture for producing an oxygen product with the $O_2$;
   a recirculation loop;
   means for recirculating the gas mixture with the oxygen product through the loop; and
   means within the loop for trapping the oxygen product.

8. In a gas laser as claimed in claim 7 wherein the reducing gas is selected from the group consisting of $H_2$ or $D_2$.

9. In a gas laser as claimed in claim 8 wherein the reducing gas is up to 3% of the gas mixture.

10. In a gas laser as claimed in claim 8 or 9 wherein the trapping means is a molecular sieve.

11. In a gas laser as claimed in claims 7 or 8 wherein the laser is a pulsed high pressure $CO_2$ TE laser.

* * * * *